United States Patent
Marechal et al.

(10) Patent No.: US 10,214,597 B2
(45) Date of Patent: Feb. 26, 2019

(54) DUAL-CURE CATIONICALLY POLYMERISABLE COMPOSITION AND METHOD FOR PRODUCING A COATING OR A COMPOSITE MATERIAL IMPLEMENTING SAID COMPOSITION

(71) Applicants: A ET A MADER, Lille (FR); UNIVERSITE DE HAUTE ALSACE, Mulhouse (FR)

(72) Inventors: David Marechal, Bartenheim (FR); Adrien Criqui, Mulhouse (FR); Xavier Allonas, Mulhouse (FR); Maxime Lecompere, Mulhouse (FR)

(73) Assignees: A ET A MADER, Lille (FR); UNIVERSITE DE HAUTE ALSACE, Mulhouse (FR)

( * ) Notice: Subject to any disclaimer, the term of this patent is extended or adjusted under 35 U.S.C. 154(b) by 0 days.

(21) Appl. No.: 15/121,497

(22) PCT Filed: Feb. 27, 2015

(86) PCT No.: PCT/FR2015/050490
§ 371 (c)(1),
(2) Date: Aug. 25, 2016

(87) PCT Pub. No.: WO2015/136180
PCT Pub. Date: Sep. 17, 2015

(65) Prior Publication Data
US 2016/0362507 A1  Dec. 15, 2016

(30) Foreign Application Priority Data
Feb. 28, 2014 (FR) ...................... 14 51647

(51) Int. Cl.
*C08F 2/50* (2006.01)
*C09D 163/00* (2006.01)
*C08F 2/46* (2006.01)
*C08G 59/68* (2006.01)

(52) U.S. Cl.
CPC ............. *C08F 2/46* (2013.01); *C09D 163/00* (2013.01); *C08F 2410/04* (2013.01); *C08G 59/68* (2013.01)

(58) Field of Classification Search
None
See application file for complete search history.

(56) References Cited

U.S. PATENT DOCUMENTS

| | | | |
|---|---|---|---|
| 4,393,185 A | 7/1983 | Berner | |
| 6,562,410 B1 | 5/2003 | Mayer | |
| 6,632,897 B1 | 10/2003 | Geiter | |
| 6,770,686 B2 * | 8/2004 | Frings | C08G 59/68 522/13 |

FOREIGN PATENT DOCUMENTS

DE  102007038573 A1  2/2009

OTHER PUBLICATIONS

J.V.Crivello, T.P. Lockart, and J.L.Lee Journal of Polymer Science Polymer Chemistry, Edition 21, 97-109 (1983) Diaryliodonium salts as thermal initiators of cationic polymerization CCC 0360-6376/83/010097.

J.V.Crivello Advances in Polymer Science. 62, 1-48 (1984) Cationic Polymerization—Iodonium and sulfonium salt photoinitiators.

Y. Yagci and T. End Advances in Polymer Science, vol. 127, 59-86 (1997) N-Benzyl and N-Alkoxy pyridinium salts as thermal and Photochemical initiators for cationic polymerization.

Y. Yagci and I. Reetz Progress in Polymer Science, vol. 23, 1485-1538 (1998) Externally stimulated initiator systems for cationic polymerization S0079-6700(98)00010-0.

J.V.Crivello Journal of polymer science: Part A: Polymer Chemistry, vol. 44, 6750-6764 (2006) Dual Photo- and Thermally Initiated Cationic polymerizatioon of epoxy monomers Publised online in Wiley InterScience (www.interscience.wiley.com).

* cited by examiner

*Primary Examiner* — Sanza L. McClendon
(74) *Attorney, Agent, or Firm* — MH2 Technology Law Group, LLP

(57) ABSTRACT

In a first aspect, the present invention concerns a kit for a polymerizable composition comprising a portion A constituted by a composition comprising at least one monomer (a1) that is reactive towards a cationic species (b) or a Lewis or Brönsted acid species, and at least one co-initiator, and a portion B comprising at least one cationic salt (e) selected from the salts with formula S1, S3, and S4 shown and defined in claim 1. In a second aspect, the present invention concerns a method of producing a coating or a composite material starting from polymerizable composition comprising at least one salt (e) selected from the salts with formula S1, S2, S3, and S4 shown and defined in claim 10, said composition being polymerized without adding external heat thereto.

20 Claims, 6 Drawing Sheets

DUAL-CURE CATIONICALLY POLYMERISABLE COMPOSITION AND METHOD FOR PRODUCING A COATING OR A COMPOSITE MATERIAL IMPLEMENTING SAID COMPOSITION

The present invention relates to the field of compositions that are polymerisable via a cationic pathway, possibly using radiation or electron bombardment, comprising a reactive monomer and an initiator system that can initiate cationic polymerisation, comprising a cationic salt and a co-initiator. The cationic polymerisation in the context of the present invention may be initiated by two different pathways, which may be combined: irradiating the cationic salt with light for the first pathway; and a thermal reaction between the reactive monomer and one or more species liberated by exothermic reaction between the cationic salt and the co-initiator, in particular without adding external heat, for the second pathway. The invention also relates to a method of cationic polymerisation of a composition of this type.

BACKGROUND OF THE INVENTION

Cationic photopolymerisation was developed with the intention of permitting the polymerisation, under light irradiation, of monomers that cannot be polymerised by a radical pathway, for example epoxy resins.

Photopolymerisation of epoxy resins by a cationic pathway was thus primarily developed in the field of paints, coatings, and adhesives. However, cationic photopolymerisation suffers from slower polymerisation rates and lower final degrees of conversion than those obtained by means of polymerisation via a radical pathway. Drying epoxy-based paints or curing epoxy-based parts may thus take from about 10 minutes (min) to several hours (h).

In addition, photopropagation within the thickness of coatings to be polymerised, and thus the photopolymerised thicknesses obtained, are more limited with the cationic pathway because of the limited number of potential initiators and monomers, and also because of the complexity of polymerisation mechanisms.

Thus, cationic photopolymerisation is more suitable for thin products and/or products with a low filler content and/or products that are not highly colored. Cationic photopolymerisation has become highly developed, starting from the academic and industrial work by J. V. Crivello who discovered the family of onium salts as photoinitiators (see the following publications: J. V. Crivello, T. P. Lockart, and J. L. Lee: Journal of Polymer Science Polymer Chemistry, Edition 21, 97-109 (1983), studying the thermal decomposition of iodonium and sulfonium salts with the addition of heat; J. V. Crivello: Advances in Polymer Science. 62, 1-48 (1984), studying iodonium and sulfonium salts as photoinitiators).

This family of photoinitiators includes iodonium, sulfonium, phosphonium and pyridinium salts.

Iodonium and sulfonium salts are the most widely used. Phosphonium salts are difficult to use because of their toxicity. Pyridinium salts are more complete photoinitiators because they can be used alone to initiate a cationic polymerisation by irradiation or thermally, but with heating of the salt in order to destabilize it and cause it to decompose, the heating temperature being higher than 40° C.; it may be up to 120° C. These latter salts have been developed and studied by Y. Yagci (see publications: Y. Yagci and T. End. Advances in Polymer Science 127, 59-86 (1997), studying pyridinium salts as a photoinitiator or thermal initiator; Y. Yagci and I. Reetz, Progress in Polymer Science 23, 1485-1538 (1998), studying pyridinium salts as a photoinitiator or thermal initiator).

Cationic polymerisation via a thermal pathway, in particular of epoxies, is rather limited because of the small number of initiators that are available. Epoxy resins are usually polymerised by amines as the principal or secondary initiator (co-initiator).

Initiator systems composed of acid anhydrides or indeed thiols are also known. These initiator systems, namely amine, acid anhydride, and thiols, result in polymerisation of the anionic type or in polycondensation. The structure of the polymer obtained by polycondensation is very different from structures obtained by an anionic or cationic pathway. With polycondensation, a three-dimensional (3D) network is constituted by polymer chains connected together via nitrogen-type bridges. Thus, its nature is more that of a copolymer than a homopolymer, in particular an epoxy. With cationic and anionic polymerisation, a 3D network may be generated with cross-linking ties of the same chemical nature as the polymer chains. A polyether matrix is formed thereby.

In order to be able to polymerise larger thicknesses than those obtained by photopolymerisation, hybrid initiator systems have been developed that involve two different chemistries, namely that of epoxies and that of urethanes, for example.

Initiator systems are also known that can be used for photochemical polymerisation followed by a thermal pathway using heat.

EP 0 066 543 relates to polymerisable compositions comprising epoxy monomers (A) polymerised by adding external heat to said compositions, i.e. by heating, in the presence of a catalyst (B) and a co-catalyst (C). The catalyst (B) or initiator comprises a quaternary ammonium salt, in particular an aromatic N-heterocyclic compound. Under the effect of heat, the co-catalyst (C) generates a radical that reduces the catalyst (B) in a redox reaction, producing a by-product that initiates the polymerisation reaction by reaction with the monomer (A). Without adding heat, and thus at ambient temperature, a polymerisation reaction cannot take place.

Thus, there is a need for a cationic polymerisation initiator system that can be used to combine photopolymerisation and/or polymerisation via a thermal pathway in the presence of a co-initiator, without adding heat, and that can be used for polymerisation via a photochemical pathway at the surface and via a thermal pathway in the core of the layer to be polymerised as a function of said layer, regardless of whether it is filled and/or pigmented and/or includes reinforcement. Systems of this type are known as dual-cure cationic systems.

The term "dual-cure" as used in the context of the present invention means any system that involves two polymerisation processes, i.e. a photochemical process and a thermal process (in particular via the exothermicity of the reaction). The term "dual-cure" means that the chemistries of polymerisation by a photochemical pathway and by a thermal pathway are similar. When there are two chemistries that are different, for example a radical chemistry and a cationic chemistry, or indeed an epoxy chemistry and a urethane chemistry, for example, that is termed hybrid polymerisation.

Thus, the present invention relates to a composition that can be polymerised by a dual-cure cationic pathway, using the same chemistry issuing from the same initiator for photochemical initiation and/or thermal initiation as a function of the thickness and transparency of the coating to be polymerised (which may optionally be filled and/or pigmented).

OBJECT AND SUMMARY OF THE INVENTION

In a first aspect, the present invention provides a kit for a polymerisable composition, said kit comprising:
- a portion A constituted by a composition comprising at least one monomer (a1) that is reactive towards a cationic species or a Lewis or Brönsted acid species, and at least one co-initiator (b);
- a portion B optionally comprising a solvent and/or at least one monomer (a2) that is reactive towards a cationic species or a Lewis or Brönsted acid species, and at least one cationic salt (e) selected from the salts with formula S1, S2, S3, and S4 below;

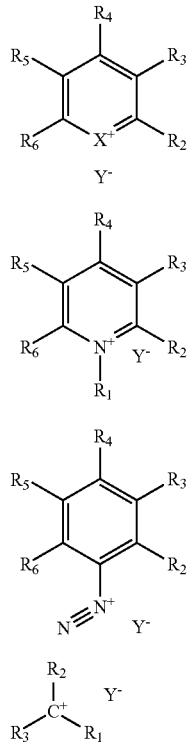

in which:
- X represents a carbon atom or a positively charged heteroatom other than nitrogen;
- Y represents one or more stabilizing anionic species for the cationic species of the salt S1 or S2 or S3, or S4, in particular comprising at least one anionic species selected, alone or in combination, from $Br^-$, $Cl^-$, $BF_4^-$, $PF_6^-$, $AsF_6^-$, $AnF_6^-$, $SbF_6^-$, $SnF_6^-$, $ClO_4^-$, sulfonates such as trifluoromethane sulfonate, perfluorosulfonate, tris [(trifluoromethyl)sulfonyl]methanide and tetra (pentafluorophenylborate);
- $R_1$ to $R_6$, independently of one another, are selected from the following atom or atoms or group or groups, alone or in combination, optionally arranged so as to carry one or more positive charges: a hydrogen atom; a nitro group $-NO_2$; a cyano group $-CN$; a halogen atom; a $C_1$-$C_{20}$ alkyl group, optionally substituted with one or more group(s) or one or more atoms selected independently from list I comprising the following groups or atoms: hydroxyl; carbonyl, alkenyl, aryl, heteroaryl, ether, ester, aldehyde, ketone, carboxylic acid, halogen, primary amine, secondary amine, tertiary amine, primary amide, secondary amine, tertiary amine, urea, thioester, thiocarbonate, sulfoxide, sulfone, phosphine, phosphorane, phosphine oxide, cycloalkyl, heterocycloalkyl, or combinations thereof; a $C_1$-$C_{20}$ alkoxy group, optionally substituted with a $C_1$-$C_{20}$ alkyl group and/or one or more group(s) or one or more atoms selected equally well from list I; an aryl group; a heteroaryl group; a cycloalkyl group; a heterocycloalkyl group; the or said (hetero)aryl groups and/or the or said (hetero)cycloalkyl groups optionally being substituted with one or more group(s) independently selected from list I; an acyl group; an aroyl group; an alkoxycarbonyl group; a carbamyl group.

Said kit also optionally includes a photosensitizer (c) that may equally well be in the portion A and/or in the portion B.

It has been discovered that the initiators S1 and/or S2 and/or S3 and/or S4 can initiate polymerisation of the reactive monomer(s) (a1) and/or (a2) by reaction with a co-initiator (b), in particular without adding external heat to the mixture comprising the portions A and B.

Advantageously, the reaction between said salt of the invention with a co-initiator is exothermic, in the presence or absence of radiation and/or electron bombardment, in a manner such that thermal polymerisation may be initiated at greater depths and at ambient temperature, and thus without adding external heat to the mixture comprising the portions A and B.

The invention may be employed to carry out polymerisation, over thicknesses from a few micrometers to several centimeters, in a properly controlled manner, of monomers (a) that are reactive to the addition of cations or acid species, and in particular of monomers that are or include one or more cyclic ether group(s).

Advantageously, the kit in accordance with the invention may be used to produce a polymer of the same nature with an identical polymerisation reaction: cationic polymerisation. A 3D network may be generated with cross-linking ties having the same chemical nature as the polymer chains. As an example, a polyether matrix is formed that involves a reactive monomer that is or includes at least one cyclic ether group.

The term "given radiation" means any radiation such as ultraviolet and/or visible radiation, in particular with wavelengths in the range [100 nanometers (nm)-1000 nm], limits included. The photopolymerisation of the invention may also be induced by electron bombardment. The term "irradiated" means any component such as the salt (e) in accordance with the invention, which is subjected to irradiation or to bombardment with electrons.

Trifluoromethane sulfonate is also known as the triflate ion ($CF_3SO_3^-$), and tetra (pentafluorophenylborate) is also known as tris(2,3,5,6-tetrafluorophenyl)borate.

The kit in accordance with the invention comprises, as the initiator system, at least one salt selected from the salts S1, S2, S3, and S4, preferably selected from the salts S1, S3, and S4, more preferably selected from the salts S1 and S4, more particularly a salt selected from the salts S1, which are capable of forming an initiator species for the polymerisation reaction of said reactive monomer (a1, a2) by reaction with a co-initiator (b), under the effect of or in the absence of radiation or electron bombardment.

The polymerisable composition may comprise a plurality of salts selected equally well from S1, S2, S3, and S4.

The cationic salt (e) may include a plurality of positive charges.

If the cationic salt S1, S2, S3, or S4 includes a plurality of positive charges, Y may be a plurality of identical or different anionic species.

The term "initiator" means a chemical compound that can be used to initiate the cationic polymerisation reaction, which is not to be confused with a co-initiator. A co-initiator reacts with the initiator, either with the aim of starting the polymerisation reaction by reaction with the initiator, or with the aim of supplementing the action of the initiator and increasing the rate of the polymerisation reaction.

Preferably, the co-initiator or co-initiators is/are a nucleophilic species or a metallic salt or an organometallic salt, more preferably a nucleophilic species.

The term "nucleophile" means any entity that is rich in electrons that has a negative charge or that has at least one free electron pair that has an affinity for any electron-depleted center (known as an electrophile).

The term "organometallic salt" means any compound in which a metal atom is directly bonded to one or more carbon atoms.

Preferably, the reactive monomer (a1) and/or the reactive monomer (a2) and/or the co-initiator (b) and/or the photosensitizer (c) and/or the polymerisation rate regulating agent (d) and/or the cationic salt (e) is/are different.

The reactive monomer (a1) and the reactive monomer (a2) may be identical. Each of the portions A and B (independently of each other) may comprise a plurality of reactive monomers (a1, a2) in accordance with the invention that are different. The portion A may include a plurality of co-initiators in accordance with the invention that are different. The portion B may include a plurality of cationic salts (e) in accordance with the invention that are different.

Each of the portions A and B may include a plurality of polymerisation rate regulating agents (d) in accordance with the invention that are different and/or a plurality of photosensitizers (c) that are different.

Preferably, concerning the salt S1, X is a sulfur atom or an oxygen atom, more preferably an oxygen atom.

The salt S4 is a carbenium salt, which may be a primary salt $R_1$—$CH_2^+$, a secondary salt $R_1R_2CH^+$, or a tertiary salt $R_1R_2R_3C^+$.

The cationic species coupled to a counter-ion $Y^-$ forms a cationic salt.

The substituents $R_1$ and/or $R_2$ and/or $R_3$ and/or $R_4$ and/or $R_5$ and/or $R_6$ may optionally be identical.

Without wishing to be bound to a scientific theory, under the effect of radiation or electron bombardment, the performance of the invention could be explained by means of the mechanisms illustrated in FIG. 1 accompanying the present text, in the absence of a photosensitizer (c), a co-initiator (b) and a polymerisation rate regulating agent (d).

The cationic salts S1, S2, S3, and S4 behave as cationic photoinitiators. Under irradiation, the species S1, S2, S3, or S4 should become an excited species S1*, S2*, S3*, or S4*. After excitation, the molecule should be neutralized by transfer of an electron with the salt S1 or by decomposition with the salts S2, S3, and S4.

With the salt S1, a radical species (S1$^-$) should result from the reaction. In addition, liberation of the acid species HY (with S1) should take place.

With the salts S2, S3, and S4, after decomposition, either liberation of novel cationic species is observed with S2 and S3 in particular, or liberation of acid species HY is observed with S4. Furthermore, the photoinitiator S3 releases gaseous dinitrogen $N_2$ in addition to the acid species. The acid species HY or cationic species that are liberated then initiate the cationic polymerisation by reaction with said reactive monomer (a).

In accordance with one embodiment, the cationic polymerisation is accelerated in the presence of at least one radical photosensitizer (c) of type I or II, or indeed by one or more co-initiators (b) and/or polymerisation rate regulating agent(s) (d) described below. The polymerisation rate regulating agent(s) (d) can be used to adapt the absorption spectrum of the photoinitiator selected from S1, S2, S3, and S4, improving, for example, the efficiency of the photoinitiator under visible light.

In accordance with one embodiment, said polymerisation rate regulating agent (d) is, for example, a molecule of cyclodextrin, for example alpha, beta, or gamma-cyclodextrin, or indeed a crown ether.

In accordance with one embodiment, $R_1$ to $R_6$, independently of one another, are selected from the following atom or atoms or group or groups, alone or in combination, optionally arranged so as to carry one or more positive charges: a hydrogen atom; a nitro group —$NO_2$; a cyano group —CN; a halogen atom; a $C_1$-$C_{20}$ alkyl group, optionally substituted with a hydroxyl group or a carbonyl group; an alkoxy group; a $C_1$-$C_{20}$ alkyl group substituted with a primary or secondary amine; an aryl group; a heteroaryl group; a cycloalkyl group; a heterocycloalkyl group; a $C_1$-$C_{20}$ alkyl group substituted with at least one aryl group; an alkenyl group; an alkynyl group; an acyl group; an aroyl group; an alkoxycarbonyl group; a carbamyl group; a $C_1$-$C_{20}$ haloalkyl group.

Preferably, $R_1$ to $R_6$, independently of one another, are selected from the following atom or atoms or group or groups, alone or in combination, optionally arranged so as to carry one or more positive charges: a hydrogen atom; a $C_1$-$C_{20}$ alkyl group, optionally substituted with a hydroxyl group; a $C_1$-$C_{10}$ alkoxy group, optionally substituted with a $C_3$-$C_{10}$ aryl group, preferably a phenyl group; it may, for example, be an alkylphenylether; chlorobenzene; a halogen atom; a $C_3$-$C_{20}$ aryl group such as a phenyl group (—$C_6H_5$), optionally substituted with a hydroxyl group and/or an alkyl chain optionally substituted with a hydroxyl group.

More preferably, $R_1$ to $R_6$, independently of one another, are selected from the following atom or atoms or group or groups, alone or in combination: a hydrogen atom; a phenyl group $C_6H_5$; a methyl group —$CH_3$; an ethyl group; an isopropyl group; a n-propyl group, a n-butyl group; a sec-butyl group; a ter-butyl group; an isobutyl group; a chlorobenzene group (—$C_6H_5Cl$); a phenylalkoxy group, such as the group —($C_6H_5$)$OCH_3$; a phenol group, —$C_6H_5$(OH); a phenyl group optionally substituted with a hydroxyl group and/or an alkyl chain optionally substituted with a hydroxyl group, such as the group $C_6H_5((CH_2)_2OH)$.

Within the context of the present invention, the expression "$R_1$ to $R_6$, independently of one another, are selected from the following atom or atoms or group or groups, alone or in combination" means that said group(s) and/or said atom(s) may be combined together.

Within the context of the present invention, the term "arranged so as to carry one or more positive charges" means that said atom(s) and/or said group(s) may include a positive charge.

The definitions indicated below apply to cationic salt(s) (e), but also to the reactive monomers (a1, a2) and/or to the co-initiator(s) (b), and/or to the polymerisation rate regulating agents (d).

Within the context of the present invention, when a group is "$C_n$-$C_p$" (also described as $C_n$ to $C_p$), this means that it contains n to p carbon atoms, n and p being integers.

The term "heteroatom" means any atom other than a carbon atom and a hydrogen atom, which is not metallic, in particular oxygen, sulfur, nitrogen, phosphorus, or indeed the halogens.

The term "halogen atom" means: fluorine, chlorine, bromine, iodine and astatine.

Within the context of the present invention, the term "(halo)alkyl group or chain" means any alkyl group or chain, which may optionally be saturated, linear or branched, optionally substituted with one or more halogen atoms, preferably $C_1$-$C_{20}$, more preferably $C_1$-$C_{15}$, yet more preferably $C_1$-$C_{10}$, more particularly $C_1$-$C_6$, yet more particularly $C_1$-$C_4$, in particular $C_1$-$C_4$.

Within the context of the present invention, the term "alkoxy group" means any group with formula $R_a$—O in which $R_a$ represents an alkyl group that may optionally be saturated, linear or branched, optionally including an —OH function, preferably $C_1$ to $C_{20}$, yet more preferably $C_1$ to $C_{10}$, more preferably $C_1$ to $C_6$, more particularly $C_1$ to $C_4$, such as, for example, the groups methoxy, ethoxy, isopropoxy, n-propoxy, i-propoxy, n-butoxy, i-butoxy, sec-butoxy, tert-butoxy, n-pentoxy, and n-hexyloxy.

Within the context of the present invention, the term "aryl group" means one or more aromatic ring(s), each of said rings being $C_3$ to $C_{20}$, preferably $C_3$ to $C_{10}$, more particularly $C_3$ to $C_7$, yet more particularly $C_5$ to $C_7$, which may be coupled or fused. Said aromatic ring(s) may be bonded via an ether bond, —O—. In particular, the aryl groups may be monocyclic or bicyclic or tricyclic or tetracyclic or pentacyclic groups; for example, a phenyl group or an anthracene group or indeed anthracenium, or indeed the tropylium ion; preferably, it is the phenyl group.

The aryl group in the invention may also be combined with a halogen atom, in which case the aryl group is substituted with a halogen atom; it may be chlorobenzene, for example.

Within the context of the present invention, the term "heteroaryl group" means one or more $C_3$ to $C_{20}$ aromatic rings, preferably each of said rings being $C_3$ to $C_{10}$, more particularly $C_3$ to $C_6$, wherein one or more atom(s) of the carbocycle(s) is/are substituted with one or more heteroatom(s), said carbocycle(s) possibly being coupled or fused. Said heteroaryl group is pyridine, for example. In particular, said aryl groups may be monocyclic or bicyclic or tricyclic or tetracyclic or pentacyclic groups.

Within the context of the present invention, the term "cycloalkyl group" means one or more cyclic alkyl group(s), optionally coupled or fused, each of said cycle(s) preferably being $C_3$ to $C_{10}$, more particularly $C_3$ to $C_7$, for example the cyclohexyl or cyclopropyl or cyclopentyl group.

Within the context of the present invention, the term "heterocycloalkyl group" means one or more cyclic alkyl group(s), optionally coupled or fused, wherein one or more atom(s) of the carbocycle(s) is/are substituted with one or more heteroatom(s), each of said heterocycle(s) preferably being $C_3$ to $C_{10}$, more particularly $C_3$ to $C_7$, for example pyrane.

The aryl group and/or the cycloalkyl group and/or the heterocycloalkyl group and/or the heteroaryl group may be combined, optionally via a group such as that described in the present text, for example an alkyl group or an ether function —O—, and/or coupled or fused; as an example, it could be thioxanthene or xanthene, or indeed thioxanthenium or xanthenium.

Within the context of the present invention, the term "ether group" means any group with formula $R_d$—O—$R_e$; the term "ester group" means any group with formula $R_d$—(CO)—$OR_e$; the term "aldehyde group" means any group with formula $R_e$—CHO; the term "ketone group" means any group with formula $R_d$—(CO)—$R_e$; the term "carboxylic acid group" means any group with formula $R_d$—(CO)—OH; the term "urea group" means any group with formula $(R_d,R_e)$N—(CO)—N $(R_f,R_g)$; the term "carbamate group" means any group with formula $(NR_dR_e)$—(CO)—$OR_f$; preferably $(NHR_d)$—(CO)—$OR_f$; the term "anhydride carbonate group" means any group with formula $R_d$—O—(CO)—O—$R_e$ (preferably, $R_d$ and $R_e$ are other than a hydrogen atom); the term "acetal group" means any group with formula $R_d$—CH$(OR_e)_2$; the term "thioether group" means any group with formula $R_d$—S—$R_e$; the term "thioester group" means any group with formula $R_d$—CO—S—$R_e$; the term "thiocarbonate group" means any group with formula $R_d$—O—CO—S—$R_e$; the term "sulfoxide group" means any group with formula $R_d$—(S=O)—$R_e$; the term "sulfone group" means any group with formula $R_d$—S(=O)(=O)—$R_e$; the term "phosphine group" means any group with formula $PH_3$; the term "carbonate group" means any group with formula $R_b$—O—CO—$OR_c$; the term "orthoester group" means any group with formula $R_bC(OR_{c-d-e})_3$; the term "phosphine oxide group" means any group with formula $R_d$—P(=O)$(R_e)(R_f)$; the term "alkenyl group" means any group with formula $R_dR_eC$=$CR_fR_g$; the term "primary amine" means any group with formula $R_bNH_2$; the term "secondary amine" means any group with formula $R_bR_cNH$; the term "tertiary amine" means any group with formula $R_bNR_cR_d$; the term "primary amide" means any group with formula $R_bCONH_2$, or $R_bCONHR_c$ or $R_bCONR_cR_d$; the term "secondary amide" means any group with formula $(R_bCO)_2NH$ or $(R_bCO)_2NR_c$; the term "tertiary amide" means any group with formula $(R_{b-c-d}CO)_3N$; the term "acyl group" means any group with formula $R_jC$=O—; the term "carbamyl group" means any $R_jCO(NH_2)$ group; the term "carbonyl group" means any $R_kR_lC$=O group.

$R_b$, $R_c$, $R_d$, $R_e$, $R_f$, $R_g$, $R_j$, $R_k$, $R_l$, as defined above are, independently of one another: a hydrogen atom; a (halo) alkyl chain within the context of the present invention; an aryl group; a heteroaryl group; a cycloalkyl group; a heterocycloalkyl group; a primary amine; a secondary amine; a tertiary amine; a primary amide; a secondary amide; a tertiary amide; a thiol group; or combinations thereof; preferably a hydrogen atom or an alkyl chain. As an example, said alkenyl group is a vinyl group.

Within the context of the present invention, the term "alkynyl group" means any group with formula $R_hC\equiv CR_i$ in which $R_h$ and $R_i$, independently of each other, are a hydrogen atom or an alkyl chain, saturated or unsaturated, linear or branched, preferably $C_2$ to $C_{20}$, more preferably $C_2$ to $C_{10}$, more particularly $C_2$ to $C_4$.

Within the context of the present invention, the term "aroyl group" means any group with formula —$C_6H_5COR_k$ in which $R_k$ is a heteroatom, for example chlorine, or a (halo)alkyl chain or identical to $R_b$ as defined above.

Within the context of the present invention, the term "hydroxyl group" means any —OH group.

Within the context of the present invention, when a group or an atom is substituted onto a benzene ring, this latter may be substituted at the ortho, meta, or para position, in particular at the para position.

As an example, concerning the salt S4, the groups $R_1$ and $R_3$ may be fused into an aryl group, and the salt S4 is, for example, the tropylium ion; $R_2$ is then a hydrogen atom.

Concerning the salt S4, the groups $R_1$, $R_2$ and $R_3$ may also be phenyl groups, each of said groups optionally being substituted with an alkoxy group.

Concerning the salt S4, the groups $R_2$ and $R_3$ may be a heteroaryl group coupled and fused with two phenyl groups, the group $R_1$ being a phenyl group; the salt S4 is, for example, the anthracenium ion, wherein a carbon atom of the central carbocycle is substituted with oxygen and said central carbocycle is also substituted with a phenyl group.

The kit in accordance with the invention or the polymerisable composition resulting from mixing the portions A and B is preferably used to form a protective coating in the railroad sector or in the automobile sector, or indeed as a protective coating optionally filled and/or pigmented as a film of paint or lacquer.

The kit in accordance with the invention or the polymerisable composition resulting from mixing the portions A and B may also be used as a matrix for a composite material including reinforcement.

In a particular embodiment, said reinforcement is or comprises fibers or yarns considered individually or in combination, in particular deployed by weaving, knitting or braiding, and/or nonwovens, and/or particles, in particular selected from the following family of materials: para-aramid, meta-aramid, silica-based fibers, glass fibers, polyethylene-terephthalate, high density polyethylene, poly(p-phenylene-2,6-benzobisoxazole) (PBO), carbon, silicon carbide, hydrated alumina, stainless steel, grit, sand, glass beads, steel balls, and silica.

When the reinforcement is insufficiently transparent to radiation or insufficiently irradiated, for example reinforcement comprising carbon fibers, the kit or the composition comprising the portions A and B combined also includes a co-initiator that reacts with the cationic salt (e), for example at ambient temperature, so that the polymerisation reaction takes place throughout the thickness of the composite material, this reaction propagating because of the exothermicity of the reaction between the salt or the salts and the co-initiator or co-initiators. The composite material may also undergo radiation or electron bombardment so that a photopolymerisation also takes place, in particular at the surface of said composite material.

The term "ambient temperature" (T° C.) as used in the context of the present invention means the temperature of the production shop or laboratory in which the polymerisation reaction in accordance with the invention takes place, generally at a temperature in the range 10° C. to 30° C., more particularly without adding external heat to the mixture comprising the portions A and B.

In a variation, the reactive monomer (a1), and optionally the reactive monomer (a2), is/are selected from or include(s) at least one group selected from the list constituted by: cyclic ethers, in particular oxiranes, such as ethylene oxide; oxetanes such as 1,3-propylene oxide; oxolanes such as tetrahydrofuran; oxanes such as tetrahydropyran; cyclic acetals such as dioxanes, trioxanes and dioxolanes; cyclic amines such as aziridines and azetidines; cyclic iminoethers such as oxazolines; cyclic sulfides such as thietanes and thiiranes; vinyls such as vinyl ethers and vinylcarbazole; cyclic esters such as lactones, lactides, cyclic carbonates and orthoesters; cyclic amides such as lactams; cycloalkyls substituted with at least one phosphorus atom, such as phosphazenes; and cyclic siloxanes; preferably in the group constituted by cyclic ethers.

Preferably, the reactive monomer (a1), and optionally the reactive monomer (a2), is/are selected from or include(s) at least one group selected from the list constituted by: cyclic ethers, in particular oxiranes, such as ethylene oxide; oxetanes such as 1,3-propylene oxide; oxolanes such as tetrahydrofuran; oxanes such as tetrahydropyran; vinyls such as vinyl ethers and vinylcarbazole.

Preferably, the reactive monomer (a1), and optionally the reactive monomer (a2), is/are selected from or include(s) at least one group selected from the list constituted by: oxiranes, oxetanes, oxolanes, and oxanes.

Preferably, the reactive monomer (a1), and optionally the reactive monomer (a2), is/are selected from the list constituted by: aliphatic epoxies, aromatic epoxies, cycloaliphatic epoxies and oxetanes, or mixtures thereof.

Preferably, the reactive monomer (a) is selected from the list constituted by: Cyracure 6110 (DOW); Uvacure 1500 (CYTEC); Genomer 7210 (RAHN); CELLOXIDE 2021P (DÄICEL); S-100, S-32, VCHX, S-28, S-60, S-186 (SYNASIA); EPOLEAD GT401 (DÄICEL); Doublemer 4300 (DOUBLE BOND CHEMICAL); D.E.R 331 (HUNTSMAN); Epalloy 5000 (CVC); HBE 100 (HUNTSMAN specialty thermosets); butyl glycidyl ether, castor oil glycidyl ether, 1,4-butanediol diglycidyl ether, diglycidyl-1,2-cyclohexane dicarboxylate (which are aliphatic epoxies); bis[4-(glycidyloxy)phenyl]methane (DGEBA), bis[4-(glycidyloxy)phenyl] (DGBF), 1,2-epoxy-3-phenoxypropane, 4,4-methylene bis(N,N-diglycidylaniline), resorcinol diglycidyl ether, styrene oxide, phenyl glycidyl ether (which are aromatic epoxies); cyclohexene oxide, vinylcyclohexene oxide, dicyclopentadiene dioxide, 3,4-epoxycyclohexyl(3,4-epoxycyclohexanecarboxylate), triethoxy[2-(7-oxabicyclo [4.1.0]hept-3-yl]silane, bis(3,4-epoxycyclohexyl)methyladipate (which are cycloaliphatic epoxies); bis(1-ethyl-3-oxetane-methyl)ether, 3-ethyl-3-[(phenoxy)methyl]oxetane, (3-ethyl-3-oxetane) methanol, 3-ethyl-3-hydroxy-methyl-oxetane (Aron oxetane OXT-101), bis[[1-ethyl(3-oxetanil)methyl]ether] (Aron oxetane OXT-221), 3-ethyl-3-[(2-ethyl-hexyloxy)methyl]oxetane] (Aron oxetane OXT-212) (which are in the oxetanes family).

In a variation, the reactive monomer (a1), and optionally the reactive monomer (a2), is/are selected from or include(s) a $(C_3-C_{20}$ (hetero)cycloalkyl)$_n$ group, with $1 \le n \le 5$, n being an integer, said (hetero)cycloalkyl(s) being saturated or unsaturated and comprising, in at least one cycle, at least one function or one or more atom(s) or a group selected from the list constituted by: an ether group; an oxygen atom; two oxygen atoms; three oxygen atoms; a primary amine; a secondary amine; a tertiary amine; a primary amide; a secondary amide; a tertiary amide; an ester group; a carbonate group; an orthoester group; a —O—Si—O function; a vinylether function (—O—CH=CH$_2$); a halogen atom and a sulfur atom.

In a variation, the reactive monomer (a) is selected from cycloaliphatic epoxies, in particular dicycloaliphatic epoxies.

In a variation, the reactive monomer (a1), and optionally the reactive monomer (a2), is/are selected from oxetanes, cycloaliphatic epoxies, or a mixture thereof comprising at least one epoxy and at least one oxetane.

In a variation, the co-initiator (b) is selected from or includes at least one group selected from list II constituted by: hydrogen peroxide (H$_2$O$_2$); water (H$_2$O); a C$_1$-C$_{20}$ (halo)alkyl group substituted with a hydroperoxide (—OOH) and/or with a thiol group (—SH); a C$_1$-C$_{20}$ aryl group substituted with a hydroperoxide (—OOH) and/or with a thiol group (—SH); a C$_1$-C$_{20}$ heteroaryl group substituted with a hydroperoxide (—OOH) and/or with a thiol group (—SH); a $C_1$-$C_{20}$ cycloalkyl group substituted with a hydroperoxide (—OOH) and/or with a thiol group (—SH); a $C_1$-$C_{20}$ heterocycloalkyl group substituted with a hydroperoxide (—OOH) and/or with a thiol group (—SH); an alkenyl group optionally including at least one ether group, such as vinylether; said group(s) optionally being substituted with one or more (—OH) groups; and from list III constituted by a primary amine, a secondary amine; a $C_1$-$C_{20}$ alkyl group including a —PH or —$PH_2$ function; phosphine, $PH_3$; metallic salts and organometallic salts such as zinc salts; or combinations thereof.

Preferably, said at least one co-initiator is selected from or includes at least one group selected from list II. More preferably, when it/they is/are substituted with a thiol group (—SH), said group(s) is/are substituted with at least two thiol groups, more preferably at least three thiol groups, in particular at least four thiol groups.

Preferably, said above-mentioned alkenyl group including an ether group mentioned above has formula $R_z$—O—CH=$CH_2$, in which the group $R_z$ is selected from the list constituted by: a hydrogen atom; a (halo)alkyl chain; an aryl group; a heteroaryl group; a cycloalkyl group; a heterocycloalkyl group; a primary amine; a secondary amine; a tertiary amine; a primary amide; a secondary amide; a tertiary amide; a thiol group; an alkynyl group; an acyl group; an aroyl group; a carbamyl group; an alkoxy group; or combinations thereof.

The term "metallic salt" means any salt that is free of an organic portion, for example $CuBr_2$.

The term "organometallic salt" means any salt comprising one or more metallic centers bonded to at least one organic portion by covalent bonding.

With the exception of metallic salts and organometallic salts, the co-initiators mentioned above are nucleophilic species.

It has been discovered that in the presence of a co-initiator, the salts S1, S2, S3, and S4 can initiate a thermal cationic polymerisation (i.e. in the absence of irradiation, for example in the absence of light, and at low temperature, for example at ambient temperature).

This disposition advantageously means that the salts S1 and/or S2 and/or S3 and/or S4 can be used in a dual-cure system, thus combining a photopolymerisation, in particular at the surface of a coating, and a thermal polymerisation, in particular at the core and throughout the thickness of the coating, advantageously without adding external heat to the mixture comprising the portions A and B.

Said salts may also simply be used for a cationic polymerisation by a thermal pathway alone in the absence of radiation. Advantageously, the thermal polymerisation is carried out at ambient temperature, in particular in the range 10° C. to 30° C., without it being necessary to heat the polymerisable composition comprising the mixed portions A and B.

A plurality of mechanisms may be involved, depending on the nature of the co-initiator:

For the nucleophilic species Nu:

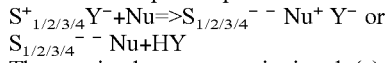

The reaction between a cationic salt (e) as the initiator and a nucleophilic species (Nu) generates a new intermediate cationic species. This new cationic species may be stable or unstable. In this latter case, a liberation of acid species HY takes place. Initiation of the thermal polymerisation may be carried out either by the new cationic species or via the acid species HY that is formed.

For the metallic or organometallic salts Mt:

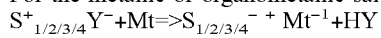

The reaction between a cationic salt as the initiator (e) with the metallic salt forms a redox pair. The metallic salt Mt reduces the cationic salt (e) to become $Mt^{-1}$. This involves a transfer of a single electron. The cationic salt (e) is thus neutralized.

In a variation, the portion A and/or the portion B include(s) a polymerisation rate regulating agent (d) that is or includes:

- a $C_3$-$C_6$ heteroaryl wherein at least one atom of the carbocycle is nitrogen, said heterocycle being substituted with: one or more $C_3$-$C_6$ aryl group(s), such as a phenyl group, a pyrane group, a furan group, or a thiophene group; and/or with one or more $C_1$ to $C_{10}$ alkyl chains, preferably $C_3$ to $C_6$, which may optionally be saturated, linear or branched, for example isobutyl;
- a $C_3$-$C_6$ aryl group substituted with: a primary amine, a secondary amine, or tertiary amine, preferably a tertiary amine; and/or with a $C_3$-$C_6$ aryl group, such as a phenyl group, a pyrane group, a furan group, or a thiophene group; and/or with one or more $C_1$ to $C_{10}$ alkyl chains that may optionally be saturated, linear or branched, preferably a tertiary amine such as a dimethylamine group, —$N(CH_3)_2$.

Said polymerisation rate regulating agent (d) can regulate the polymerisation rate in accordance with the following two mechanisms, in combination with the cationic salt (e):

- by regulating the reaction rate between the cationic salt (e) and the co-initiator (b), which results in adjusting the initiation rate. The initiation rate is then controlled by complexing the cationic salt with said polymerisation rate regulating agent (d). It has also been discovered that N, N-dimethylaniline or N-vinyl carbazole can act as the regulating agent (d) in accordance with this first mechanism. A molecule of cyclodextrin may also act in accordance with this first mechanism;
- by regulating the rate of propagation of the polymerisation. In this case, said polymerisation rate regulating agent (d) is preferably a nucleophilic or basic compound which interacts with the center of propagation. It has been discovered that 2,6-di-tert-butylpyridine or N,N-dimethylaniline can act as the regulating agent (d) in accordance with this second mechanism. Crown ethers that are known from the prior art may also act in accordance with this second mechanism, as well as sulfur-containing derivatives (such as DMSO and thiophene).

Preferably, said polymerisation rate regulating agent is selected from: 2,6-di-tert-butylpyridine, N,N-dimethylaniline and N-vinyl carbazole.

In a variation, the solvent is selected from propylene carbonate, 1,4-dioxane and dimethylsulfoxide, acetonitrile, acetone, tetrahydrofuran, and dichloromethane.

Preferably, the solvent has a polarity of 1 or more.

In a variation, the cationic salt (e) in accordance with the invention is dissolved in at least one monomer (a2) in accordance with the invention, optionally combined with a solvent.

In a variation, the photosensitizer (c) is selected from radical photoinitiators of type I, such as benzophenone; and from radical photoinitiators of type II, such as thioxanthone or anthracene.

The radical photoinitiators of type I sensitize the cationic salt (e) by transfer of electrons.

The radical photoinitiators of type II sensitize the cationic salt (e) by transfer of electrons or by transfer of energy.

In a variation, the proportion by weight of salt (e) relative to the weight of the final polymerisable composition comprising the portions A and B is in the range 0.10% to 5%, preferably in the range 0.5% to 3%, more preferably in the range 1% to 3%.

In a variation, the proportion by weight of monomer(s) (a1 and/or a2) relative to the weight of the final polymerisable composition comprising the portions A and B is in the range 80% to 95%.

In a variation, the proportion by weight of solvent relative to the weight of the final polymerisable composition comprising the portions A and B is more than 0 and less than or equal to 20%, preferably in the range 0.10% to 10%.

In a variation, the proportion by weight of co-initiator (b) relative to the weight of the final polymerisable composition comprising the portions A and B is in the range 0.10% to 5%, preferably in the range 0.5% to 3%, more preferably in the range 1% to 3%.

In a second aspect, the present invention provides a polymerisable composition comprising:
  a. at least one monomer (a1) that is reactive towards a cationic species or a Lewis or Brönsted acid species as defined in any one of the preceding variations in accordance with a first aspect;
  b. at least one co-initiator (b) as defined in any one of the preceding variations in accordance with a first aspect;
  c. optionally, a photosensitizer (c) as defined in any one of the preceding variations in accordance with a first aspect;
  d. at least one cationic salt (e) as defined in any one of the preceding variations in accordance with a first aspect; and
  e. optionally, a solvent as defined in any one of the preceding variations in accordance with a first aspect; and
  f. optionally, at least one polymerisation rate regulating agent (d) as defined in any one of the preceding variations in accordance with a first aspect.

In a third aspect, the present invention provides a method of producing a coating or a composite material employing the kit described in any one of the preceding variations or the polymerisable composition described above, comprising the following steps:
  i) providing a portion A and a portion B defined in accordance with any one of the preceding variations with reference to a first or to a second aspect, and mixing the portions A and B in order to form a polymerisable composition; or i") providing a polymerisable composition defined in accordance with any one of the preceding variations with reference to a first or to a second aspect; and
  ii) applying said polymerisable composition in one or more layers to a substrate or impregnating a reinforcement with said polymerisable composition; and
  iii) polymerising said at least one monomer (a1) under the action of a cation or of a Lewis or Brönsted acid species formed by the salt (e) under the action of said at least one co-initiator (b), without adding external heat to said polymerisable composition, and optionally of a radiation or an electron bombardment, in order to form a coating or a composite material.

The method in accordance with the invention means that, depending on the polymerisable composition, for example whether it is pigmented and/or filled, the thickness thereof applied to the substrate or the thickness and the transparency of the reinforcement, the following can be carried out: 1/photopolymerisation alone under the effect of radiation or electron bombardment acting on the cationic salt (e); 2/thermal polymerisation alone, in the absence of radiation or bombardment under the effect of the co-initiator acting on the cationic salt (e) without adding external heat to said polymerisable composition (the reaction between the salt and the co-initiator being exothermic) and finally the combination of a photopolymerisation and a thermal polymerisation 3/resulting from the combination of 1/and 2/for a dual-cure system as defined in the present invention.

Advantageously, said at least one co-initiator (b) is selected such that it is capable of reacting with said at least one cationic salt (e) without adding external heat, in an exothermic reaction, the exothermicity of the reaction contributing to maintaining and initiating the cationic polymerisation reaction of said at least one monomer (a1, a2).

Advantageously, applying radiation or electron bombardment means that the polymerisation reaction can be controlled, in particular by accelerating the kinetics for the rate of polymerisation.

Said method may be used to irradiate the polymerisable composition from completion of the application or molding, and to thereby cure the composition very rapidly. The zones that are not subjected to much irradiation or that are located in a shadowed zone are cured completely because of the thermal reactivity of the initiator system, which reacts even at low temperatures (for example: 20° C.) (comparatively, thermal curing of epoxy resins is often carried out by adding an amine or by heating with a melamine).

The method in accordance with the invention can be used to polymerise the polymerisable composition without adding external heat to said composition, and thus to obtain a thermoset matrix that may optionally be reinforced, which can be used.

In accordance with one embodiment, the method in accordance with the invention comprises a step (iv) for thermal post-treatment applied to the polymerised polymerisable composition obtained at the end of step (iii) in order to further organize the polymer chains of the thermoset matrix.

Preferably, the thermal post-treatment comprises a step of heating to a temperature of 60° C. or more, more preferably less than or equal to 100° C., for at least 10 minutes, more preferably for at least 60 minutes.

Preferably, the polymerisable composition is applied in the form of a layer or a plurality of layers, optionally with the application of radiation or electron bombardment between each layer and optionally to the assembly comprising superimposed said layer or layers.

The surface(s) of the layer or layers that are optionally exposed to radiation or electron bombardment are preferably in contact with oxygen of the air. Advantageously, the oxygen of the air does not inhibit the cationic polymerisation reaction at the surface.

In a variation, step iii) is carried out at a temperature in the range 10° C. to 30° C., preferably in the range 15° C. to 30° C., without adding external heat to said polymerisable composition.

In a variation, since said polymerisable composition is transparent to ultraviolet radiation or to visible radiation, polymerisation of the monomer (a) occurs throughout the thickness of the composition under the effect of a radiation, in particular at ambient temperature (for example in the range 20° C. to 30° C.) without adding thermal energy.

In a variation, when said composition is insufficiently transparent to ultraviolet radiation or to visible radiation or is insufficiently irradiated or is intended to form a coating with a thickness of more than 1 millimeter (mm) or that has non-irradiated shadowed zones, the co-initiator (b) acting on the initiator or cationic salt (e) leads, at ambient temperature, to polymerisation of said composition throughout its thickness, generating a polymer of the same nature and via the same cationic polymerisation reaction as the photo-induced polymerisation.

In a fourth aspect, the present invention provides the use of a cationic salt (e) defined in accordance with any one of the preceding variations with reference to a first, second or third aspect, for the cationic polymerisation of at least one reactive monomer (a1), optionally of at least one second reactive monomer (a2), defined in accordance with any one of the preceding variations with reference to a first, second or third aspect, in the presence of at least one co-initiator (b), in particular defined in accordance with any one of the preceding variations with reference to a first, second or third aspect, optionally under radiation or electron bombardment.

In a variation, the cationic salt (e) used is the salt S1, and X is an oxygen atom.

DETAILED DESCRIPTION OF THE FIGURES

DETAILED DESCRIPTION OF EMBODIMENTS

The invention can be better understood from the following exemplary embodiments presented below as non-limiting examples. The conversion kinetics of the oxirane bonds were monitored using Fourier transform infrared spectroscopy, which allowed the polymerisation process to be monitored in real time.

Figure 4A:
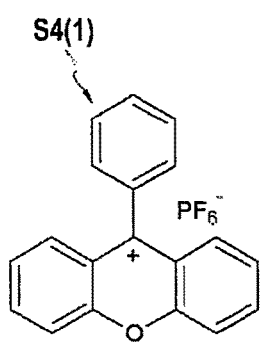
FIGS. 4A, 4B and 4C show examples of cationic salts S4(1), S4(2) and S4(3) in accordance with the invention.
Figure 4B:
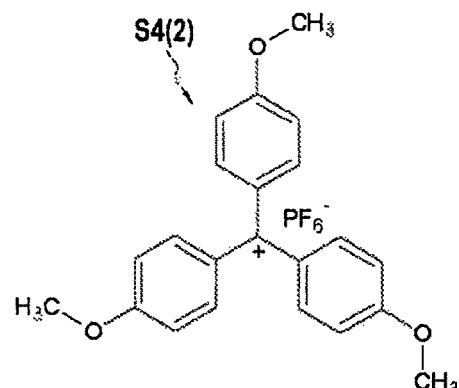
Figure 4C:
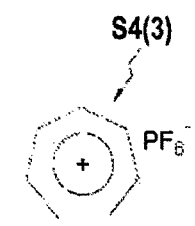

Lists of compounds employed in the polymerisable compositions described in Tables 1 to 4 below and in paragraphs I to IV:

reactive monomer (a): dicycloaliphatic epoxy, in particular (3,4-epoxycyclohexane) methyl 3,4-epoxycyclohexanecarboxylate (a1), such as Uvacure 1500; (3,4-epoxycyclohexane) methyl 3,4-epoxycyclohexanecarboxylate (a11), such as UVACURE 6110; an oxetane monomer (OXT-101, 3-methyl-3-oxetanemethanol) (a111);

cationic salts (e): cationic salt S1(1) in which X: O; $R_2$, $R_4$ and $R_6$: $C_6H_5$, $R_3$ and $R_5$: H, Y=$BF_4^-$; cationic salt S1(2) in which X: O, $R_2$ and $R_6$: CH3, $R_3$ and $R_5$: H, Y=$BF_4^-$; cationic salt S1(3) in which X: O, $R_2$ and $R_4$ and $R_6$: $C_6H_5Cl$, $R_3$ and $R_5$: H, Y=$BF_4^-$; cationic salt S1(4) in which X: O, $R_2$ and $R_4$ and $R_6$: $C_6H_5OCH_3$, $R_3$ and $R_5$: H, Y=$BF_4^-$; cationic salt S1(5) in which X: O, $R_2$: CH3, $R_4$ and $R_6$: $C_6H_5$, $R_3$ and $R_5$: H, Y=$BF_4^-$; cationic salt S1(6) in which X: O, $R_2$ and $R_6$: $C_6H_5$, $R_4$: CH3, $R_3$ and $R_5$: H, Y=$BF_4^-$; cationic salt S1(7) in which X: O, $R_2$ and $R_6$: $C_6H_5$, $R_4$: $C_6H_5OH$, $R_3$ and $R_5$: H, Y=$BF_4^-$; cationic salt S1(8) in which X: O, $R_2$ and $R_6$: $C_6H_5$, $R_4$: $C_6H_5(CH_2)2OH$, $R_3$ and $R_5$: H, Y=$BF_4^-$; cationic salt S2(1) in which $R_2$, $R_4$ and $R_6$: $C_6H_5$, $R_3$ and $R_5$: H, Y: $BF_4^-$; cationic salt S3(1) in which $R_2$, $R_3$, $R_5$ and $R_6$: H, and $R_4$: Br, Y=$BF_4^-$; and the salts S4(1), S4(2) and S4(3) shown in FIG. 4. The substituents on the benzene rings were in the para position. Each of said salts (e), previously dissolved to approximately 25% by weight in a solvent, in particular propylene carbonate, was present in an amount of 3% by weight relative to the total weight of the polymerisable composition;

co-initiators (b): hydrogen peroxide ($H_2O_2$) (b1); isobutylvinylether (b2); 4-mercaptophenol (b3);

photosensitizer (c): phenothiazine (c1).

I—Various Polymerisable Compositions in Accordance with the Invention were Subjected to Irradiation without Adding External Heat to Said Compositions (i.e. at Ambient Temperature)

The proportion by weight of cationic salt relative to the total weight of the polymerisable composition (in this case 1 gram (g)) was 3%, regardless of whether the salt was S1(1), the salt S3(1) or Irgacure 250, which is an iodonium salt.

The proportions by weight of the co-initiator (b1) and of the co-initiator (b2) relative to the total weight of the polymerisable composition were respectively 3% and 1%.

The proportion by weight of photosensitizer (C1) relative to the total weight of the polymerisable composition was 1%.

The irradiation lamp was a Hamamatsu Hg—Xe lamp with a 365 nm reflector and a power of 40 milliwatts per square centimeter (mW/cm$^2$). The polymerisable composition was applied to a substrate, in this example a KBr pellet, in the form of a single layer with a thickness of 20 micrometers (μm).

The maximum rates of polymerisation (Rp) as well as the conversions (x %) after 400 seconds irradiation under the Hg—Xe lamp obtained are contained in Table 1 below.

TABLE 1

| Example | (a) | (b) | (c) | (e) | Rp (mol · l$^{-1}$ · s$^{-1}$) | Final conversion degree (%) |
|---|---|---|---|---|---|---|
| 1 | (a1) | — | — | S1(1) | 0.19 | 75 |
| 2 | (a1) | — | (c1) | S1(1) | 0.11 | 100 |
| 3 | (a1) | (b1) | — | S1(1) | 0.38 | 93 |
| 4 | (a1) | (b2) | — | S1(1) | 0.29 | 87 |
| 5 | (a1) | — | — | S3(1) | 0.054 | 65 |
| 6 | (a1) | (b1) | — | S3(1) | 0.059 | 64 |
| 7 | (a1) | (b2) | — | S3(1) | 0.059 | 70 |
| 8 | (a1) | — | — | Irgacure 250 | 0.64 | 60 |

The high efficiency of the salt S1(1) alone should be noted; it reached a degree of conversion of approximately 75% in less than 400 seconds of irradiation. This efficiency was accentuated by the presence of a photosensitizer (c1) or indeed a co-initiator (b1) or (b2).

The salt S3(1) was less reactive under irradiation, but it reached degrees of conversion that were higher than the degree of conversion of the iodonium salt (Irgacure 250) after 400 seconds (s) of irradiation.

II—Study of the Impact of Different Structures of Cationic Salts S1 in Accordance with the Invention on the Rate of Polymerisation Rp and the Final Degree of Conversion (%) in the Absence of Co-Initiator (b), without Adding External Heat to Said Compositions, (i.e. at Ambient Temperature)

The proportion by weight of cationic salt relative to the total weight of the polymerisable composition (in this case 1 g) was 3%, regardless of whether it was for the salts S1(1) to S1(6), or Irgacure 250, which is an iodonium salt. The irradiation lamp was a Hamamatsu Hg—Xe lamp with a 365 nm reflector and a power of 40 mW/cm$^2$.

The polymerisable composition was applied to a substrate, in this example a KBr pellet, in the form of a single layer with a thickness of 20 μm.

TABLE 2

| Example | (a) | (e) | Rp (mol·l$^{-1}$·s$^{-1}$) | Final conversion degree (%) |
|---|---|---|---|---|
| 9 | (a1) | S1(1) | 0.19 | 75 |
| 10 | (a1) | S1(2) | 0.01 | 20 |
| 11 | (a1) | S1(3) | 0.23 | 57 |
| 12 | (a1) | S1(4) | 0.08 | 97 |
| 13 | (a1) | S1(5) | 0.01 | 11 |
| 14 | (a1) | S1(6) | 0.03 | 35 |
| 15 | (a1) | S1(7) | 0.04 | 89 |
| 8 | (a1) | Irgacure 250 | 0.64 | 60 |

III—Thermometric Measurements Carried Out on Various Polymerisable Compositions in Accordance with the Invention Polymerised in the Absence of Irradiation, Said Compositions Including a Co-Initiator (b), without Adding External Heat to Said Compositions, (i.e. at Ambient Temperature)

The proportion by weight of cationic salt relative to the total weight of the polymerisable composition (in this case 1 g) was 3%. The proportions by weight of the co-initiators (b1), (b2) and (b3) relative to the total weight of the polymerisable composition were respectively 1%, 3%, and 3%.

Figure 1:
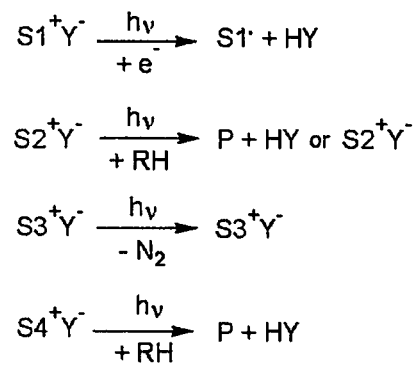
FIG. 1 shows the reaction mechanism between a cationic salt (e) and a cationic species or Lewis or Brönsted acid.
Figure 2:
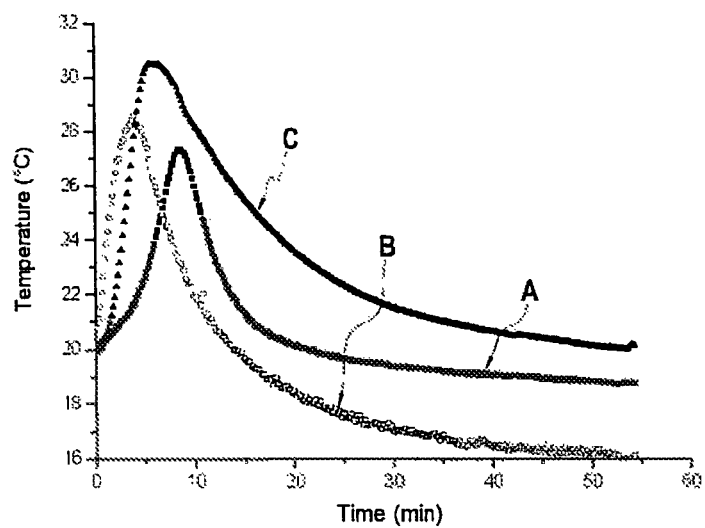
FIGS. 2 and 3 show three thermometric curves measured for examples of polymerisable compositions in accordance with the invention.
Figure 3:
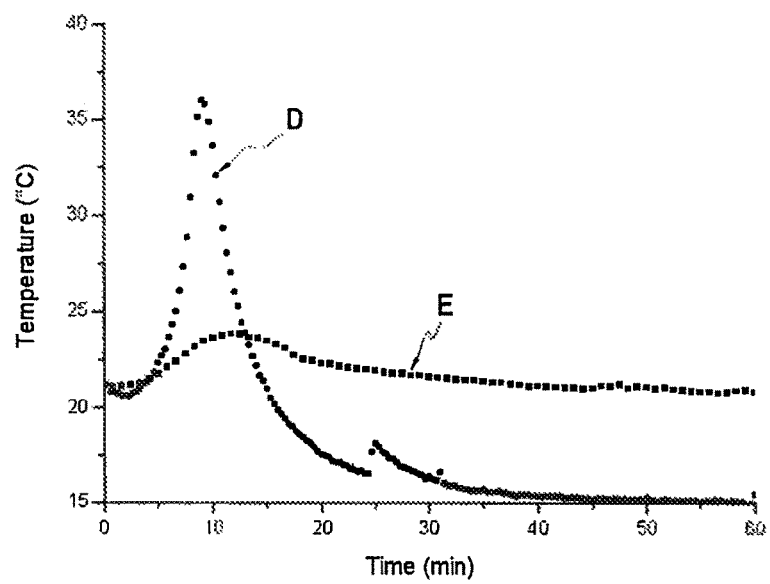

FIG. 2 shows three thermometric curves obtained from a K type thermocouple in the polymerisable compositions with references (A), (B) and (C) all comprising at least one reactive monomer (a1), a cationic salt S1(1) and a co-initiator, respectively (b1), (b2) and (b3). It can thus be observed from said curves that an efficient thermal polymerisation can be accompanied by the release of a large amount of heat. FIG. 3 shows two thermometric curves obtained from a type K thermocouple immersed in the polymerisable compositions with references (D) and (E), each comprising a reactive monomer (a1), a cationic salt S3(1) and a co-initiator, respectively (b1) and (b2).

Thermal polymerisation for the polymerisable compositions examples (D) and (E) was also observed, but with a much stronger exothermic reaction than with the co-initiator (b1).

IV—Measurements of Gelling Times (Min) Carried Out on Polymerisable Compositions Including Different Cationic Salts in Accordance with the Invention Polymerised in the Absence of Irradiation, without Adding External Heat to Said Compositions, (i.e. at Ambient Temperature), Said Polymerisable Compositions Including a Co-Initiator (b)

The gelling times were calculated from the thermometric curves obtained as described above in point III. The gelling times corresponded to the maximum of the exothermic polymerisation peak.

Table 3 below sets out the gelling times obtained for various cationic salts in combination with various co-initiators (b). The proportion by weight of cationic salt relative to the total weight of the polymerisable composition (in this case 1 g) was 3%, regardless of whether it was for the salt S1(1), the salt S2(1), the salt S3 (1) or the salts S4 (1) (2) (3). The proportions by weight of the co-initiator (b1) and of the co-initiator (b2) relative to the total weight of the polymerisable composition were respectively 1% and 3%.

TABLE 3

| Examples | (a) | (e) | (b) | Gelling times (min) |
|---|---|---|---|---|
| 20 | (a1) | S1(1) | (b1) | 15 |
| 21 | (a1) | S1(1) | (b2) | 6 |
| 30 | (a1) | S1(3) | (b1) | 10 |
| 22 | (a1) | S2(1) | (b1) | 360 |
| 23 | (a1) | S2(1) | (b2) | >600 |
| 24 | (a1) | S3(1) | (b1) | 10 |
| 25 | (a1) | S3(1) | (b2) | 20 |
| 26 | (a1) | S4(1) (2) (3) | (b1) | Instantaneous |

The structure of the co-initiator (b) meant that the rate of polymerisation could be adjusted, as demonstrated in Table 4 below.

TABLE 4

| Examples | (a) | (e) | (b) | Gelling times (min) |
|---|---|---|---|---|
| 27 | (a1) | S1(1) | R—OOH with R: ClC$_6$H$_5$CO | 2 |
| 28 | (a1) | S1(1) | R—OOH with R: CH$_3$CO | 6 |
| 31 | (a1) | S1(1) | R$_z$—O—CH=CH$_2$ R$_z$: (CH$_3$)$_2$CH$_2$ | 25 |
| 32 | (a1) | S1(1) | R$_z$—O—CH=CH$_2$ R$_z$: CH$_3$(CH$_2$)$_2$ | 16 |
| 33 | (a1) | S1(1) | R$_z$—O—CH=CH$_2$ R$_z$: CH$_3$CH$_2$ | 12 |
| 34 | (a1) | S1(1) | R$_z$—O—CH=CH$_2$ R$_z$: (CH$_2$)$_2$OH | 6 |
| 35 | (a1) | S1(1) | R—OOH R: C$_6$H$_5$ | 45 |
| 36 | (a1) | S1(1) | R—OOH R: (CH$_3$)$_3$C | 45 |
| 29 | (a1) | S3(1) | R—OOH R: (CH$_3$)$_3$C | >600 |

The gelling times were measured for the polymerisable compositions of Example 9 (S1(1)), 11 (S1(3)) and 12 (S1(4)) described above in point I and each including hydrogen peroxide as the co-initiator (b1), in the absence of irradiation. These gelling times were: <<60 minutes, of the order of 15 minutes, and of the order of 12 minutes respectively for those of Example 9 (S1(1)), 11 (S1 (3)) and 12 (S1(4)).

The high efficiency of the S1/ROOH pair (with R=ClC$_6$H$_5$CO) or —O—CH=CH$_2$) should be noted. The gelling times were adjustable (a few minutes to several hours) by adjusting the nature of the co-initiator, the nature of the substituents carried by these co-initiators as well as the structure of the cationic salt.

Figure 5:
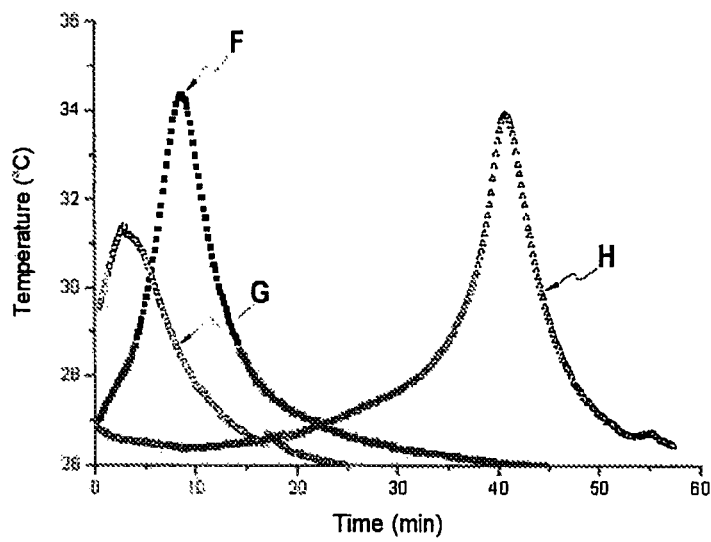
FIGS. 5, 6, 7 and 8 show thermometric curves measured for examples of polymerisable compositions in accordance with the invention.

FIG. 5 shows three thermometric curves: the first curve (F) corresponds to Example 20, which did not contain a polymerisation rate regulating agent (d); the second curve (G) corresponds to Example 20 to which 1% by weight of N-vinylcarbazole (d1) relative to the total weight of the polymerisable composition had been added; the third curve (H) corresponds to Example 20 to which 1% by weight of N,N-dimethylaniline (d2) relative to the total weight of the polymerisable composition had been added. It should also be noted that, following the addition of (d1) or (d2), the gelling times were displaced by almost 30 minutes. It is thus possible to adjust the rate of initiation.

Figure 6:
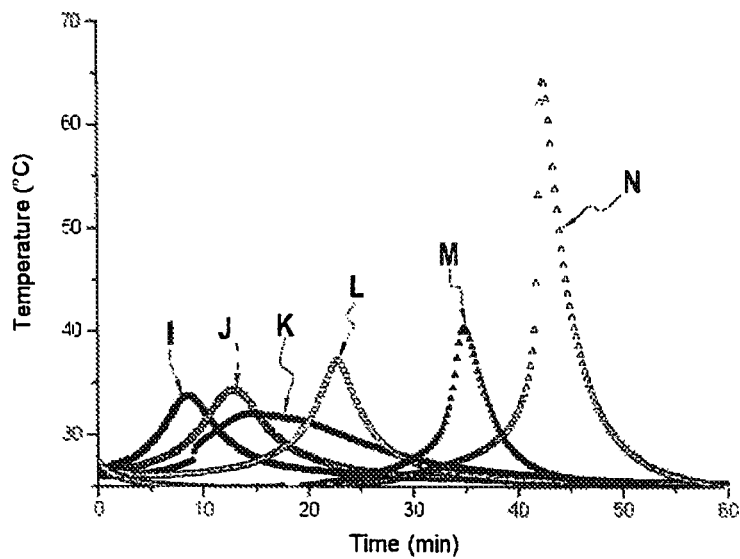

FIG. 6 shows six thermometric curves: the first curve (I) corresponds to Example 20, which did not include polymerisation rate regulating agent (d); the curves (J), (K), (L), (M) and (N) correspond to Example 20 to which 0.5%, 1%, 1.5%, 3% and 6% by weight respectively of 2,6-di-tert-butylpyridine (d3) relative to the total weight of the polymerisable composition had been added.

A shift of the gelling times as a function of the proportions of the agent (d3) was thus observed, with a substantial exothermic release of heat when the proportion of agent (d3) reached 6% by weight.

V—Polymerisation of Aromatic or Aliphatic Epoxy Resins Including One or More Oxetane Groups as the Reactive Monomer (a1), Under Irradiation and Combined with a Co-Initiator (b) in a Dual-Cure System, without Adding External Heat to Said Compositions, (i.e. at Ambient Temperature).

Figure 7:
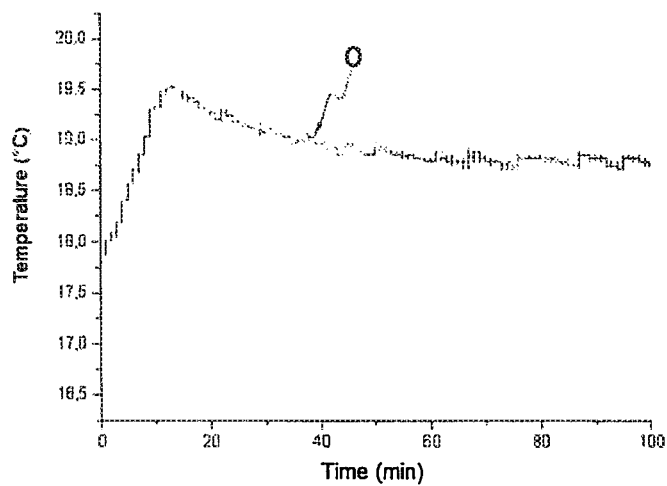

FIG. 7 shows a thermometric curve (O) corresponding to a polymerisable composition comprising 1,2-epoxy-3-phenoxypropane (sold by SIGMA-ALDRICH) as the reactive monomer (a1), isobutylvinylether as the co-initiator (b2), and a cationic salt S1(1). It should be noted that the reaction was of low exothermicity.

Figure 8:
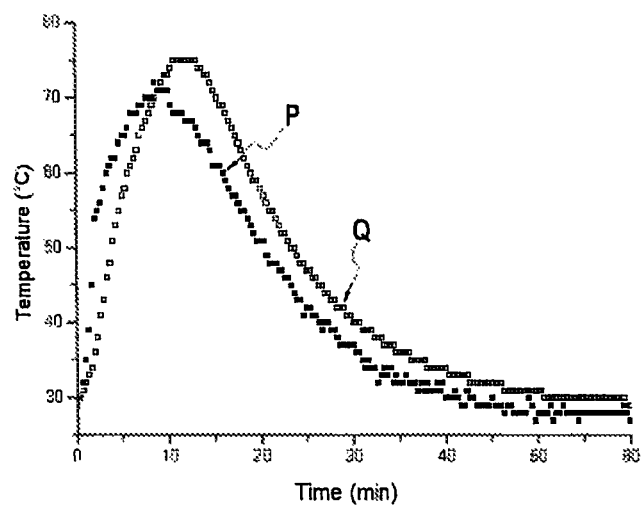
Figure 9:
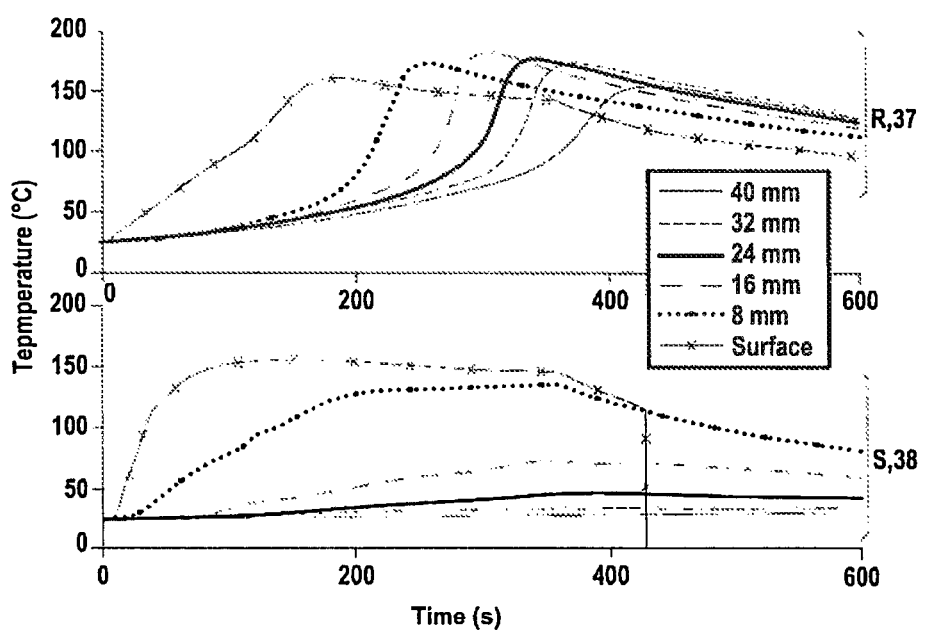
FIG. 9 shows a first series of thermometric curves measured at different thicknesses in a polymerisable composition in accordance with the invention and a second series of thermometric curves measured at different thicknesses in a reference polymerisable composition.

By way of comparison, FIG. 8 shows two curves (P) and (Q) representing the exotherms of the surface and the core respectively in the layer to be polymerised. The polymerisable composition employed in FIG. 8 corresponded to Example 21. An exothermic peak at 70° C. should be noted, which was much higher than the exothermic peak of the order of 19.5° C. shown in FIG. 7.

Cationic polymerisation, under irradiation or via a thermal pathway, i.e. at ambient temperature, of aromatic or aliphatic epoxy resins is less effective than for cycloaliphatic epoxy resins.

VI—Photopolymerisation at Depth of a Polymerisable Composition in Accordance with the Invention Compared with a Reference Polymerisable Under Irradiation and Combined with a Co-Initiator (b) in a Dual-Cure System, without Adding External Heat to Said Compositions, (i.e. at Ambient Temperature)

The polymerisable composition in accordance with the invention (Example 37) comprised a mixture of monomers: 92.5% of (a11) for 7.5% of (a111); and a salt S1(1) and a co-initiator (b2) in an amount of 3% and 1.5% by weight respectively relative to the total weight of the composition (in this case 5 g), the remainder being formed by the mixture of monomers. The reference composition (Example 38) comprised the same mixture of monomers as Example 37; and an Irgacure 250 salt and a co-initiator (b2) respectively in an amount of 3% and 1.5% by weight relative to the total weight of the composition, the remainder being formed by the mixture of monomers.

The photopolymerisation at depth was monitored by thermometry. Each polymerisable composition was placed in a test tube produced from plastic material which had previously been perforated over the length in order to accommodate thermocouples at predetermined depths on the tube (at the surface; 8 mm; 16 mm; 24 mm; 32 mm and 40 mm). Irradiation of the mixture of monomers was carried out at the level of the opening to the tube, which was covered with a glass plate, using a lamp (UV Hammamatsu lamp with 365 nm reflector) disposed at a distance of approximately 2 cm above the glass plate. The glass plate absorbed the infrared radiation produced by the lamp. In this manner, the temperature detected by the surface thermocouple would solely be from the photopolymerisation reaction.

The first series (R) of thermometric curves corresponding to the polymerisable composition in accordance with the invention (Example 37) and the second series of thermometric curves (S) corresponding to the reference polymerisable composition (Example 38) were very different.

Concerning Example 38 (reference), the temperature increased rapidly at the surface due to the photopolymerisation reaction in the mixture of monomers. The curve associated with the thermocouple located 8 mm below the surface fairly rapidly followed the same profile as the curve associated with the surface thermocouple. The curves associated with the thermocouples located at more than 8 mm were very different, since it can be seen that the temperature measured in the polymerisable composition 38 dropped. In this case, photopolymerisation at depth occurred in accordance with a process of thermal transfer/diffusion, the heat generated at the surface only propagating to a small extent into the thickness. Curing at depth (beyond 8 mm) was thus incomplete.

Concerning Example 37 (composition in accordance with the invention), the surface temperature also increased rapidly for the same reasons as those given for Example 38. However, the profile for the curve associated with the surface thermocouple and the curves associated with the other thermocouples were almost identical throughout the thickness of the composition 37 (40 mm). In this case, photopolymerisation at depth occurred along a polymerisation front, changing the polymer, polymerised and hot, into a mixture of liquid polymers that were thus not polymerised and cold. The fact that the maximum temperature was the same throughout the thickness means that the polymerisable composition in accordance with the invention, 37, caused the polymerisation front to be self-sustaining—this is an essential element with photopolymerisation at depth without adding external heat.

VII—Comparison of the Mechanical Properties Obtained for a Polymerisable Composition in Accordance with the Invention, Example 39, (the Composition of which Corresponds to Example 21 Described Above) Compared with the Mean of the Values Obtained for Reference Polymerisable Compositions from the Prior Art.

Table 5 below indicates the commercial names of reference compounds from the prior art (commercial reference of epoxy monomer/commercial reference of amine monomer), the implementation cycles and their applications.

TABLE 5

| Commercial name | Implementation cycles | Application |
| --- | --- | --- |
| DER 332/DEH 619 | 8 days at ambient temp. | Industrial |
| DER 331/DEH 2919 | 8 days at ambient temp. | matrices |
| Epikote 05475/ Epikure 05443 | 5 min to 120° C. | High performance |
| Araldite LY 5052/ Aradur 5052 | 1 day at ambient temp. followed by thermal post-treatment of 4 h at 100° C. Or 4 h at 80° C. | matrices |
| Araldite MY 0816/ Aradur 976-1 | 2 h at 100° C. followed by two thermal post-treatments: 2 h at 150° C. and 2 h at 220° C. | |
| Araldite MY 0510/ Aradur 976-1 | 2 h at 150° C. followed by two thermal post-treatments: 4 h at 180° C. + 2 h at 200° C. | |

TABLE 5-continued

| Commercial name | Implementation cycles | Application |
| --- | --- | --- |
| Araldite MY 720/ Aradur 976-1 | 2 h at 80 followed by three thermal post-treatments: 1 h at 100 + 4 h at 150 + 7 h at 200° C. | |

Figure 10:
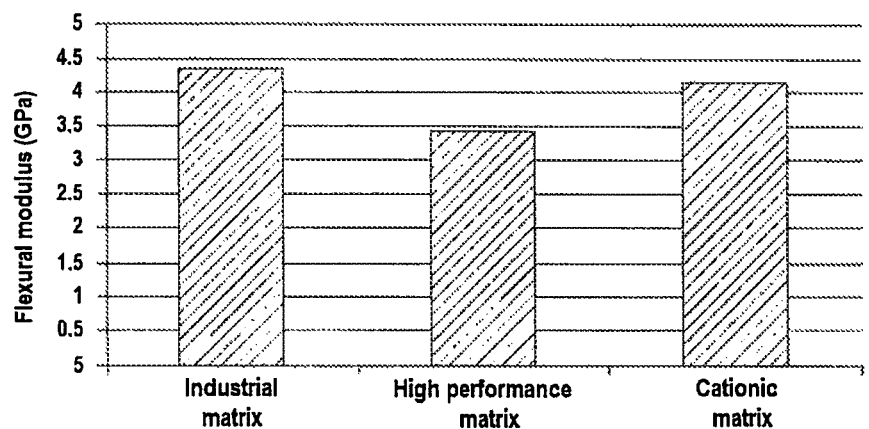
FIG. 10 shows values for the flexural modulus (GPa) (ISO standard 178: 2010) obtained for industrial matrices, high performance matrices and a matrix in accordance with the invention.
Figure 11:
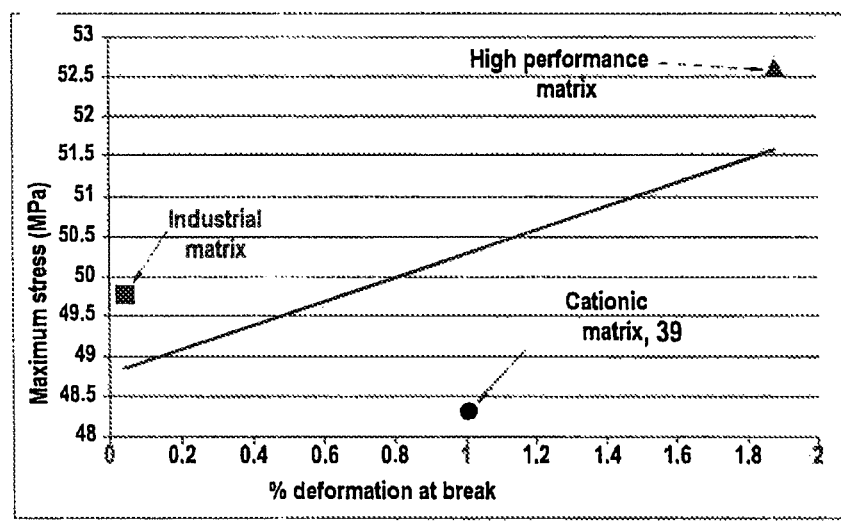
FIG. 11 shows the values obtained for the maximum stress as a function of the percentage deformation (ISO standard 178:2010) for industrial matrices, high performance matrices, and a matrix in accordance with the invention.

The polymerisable composition in accordance with the invention, Example 39, (the composition of which corresponds to Example 21) was polymerised for one day at ambient temperature without adding external heat to the composition 39. A step of thermal post-treatment applied to the thermoset matrix in order to reorganize the polymer chains that had been formed was carried out for 4 h at 100° C. The means of the values measured for the flexural moduluses in gigapascals (GPa) and for the maximum stresses in mega pascals (MPa) obtained for the industrial matrices, the high performance matrices and the matrix obtained from polymerisation of the polymerisable composition 39 are recorded in the accompanying FIGS. 10 and 11. Thus, it can be seen that the matrix obtained by cationic polymerisation of the composition 39 can be used to obtain highly satisfactory mechanical performances.

VIII—Comparison of Thermal Properties Obtained for Two Polymerisable Compositions in Accordance with the Invention Example 39 mentioned above (the composition of which corresponds to Example 21 described above) and Example 40, identical to Example 39 with the difference that no thermal post-treatment steps were carried out, were compared with the reference polymerisable compositions from the prior art described in Table 5.

Table 6 below records the glass transition temperatures ($T_G$) determined by DMA (dynamic mechanical analysis) for the prior art compositions, corresponding to those also indicated in Table 5, which had undergone the implementation cycles described in Table 5, as well as for the compositions in accordance with the invention (Examples 39 and 40). This Table 6 also records the decomposition temperatures (Td) determined by TGA (thermogravimetric analysis) for a prior art composition corresponding to that also indicated in Table 5 and which had undergone the implementation cycle described in Table 5, and for a composition in accordance with the invention corresponding to Example 40.

TABLE 6

| References for the polymerisable compositions | |
| --- | --- |
| | $T_G$ (° C.) |
| DER 332/DEH 619 | 77° C. |
| Araldite CY 179/Aradur 917 | 189° C. |
| Epikote/Epikure | 127° C. |
| Araldite LY 5052/Aradur | 126° C. |
| Araldite MY 0510/Aradure | 191° C. |
| Example 39 | 160-200° C. |
| Example 40 | 125° C. |
| | Td (° C.) |
| Araldite CY 179/Aradur 917 | 372° C. |
| Example 40 | 404° C. |

Advantageously, the polymerisable compositions in accordance with the invention could be used to obtain values for $T_G$ and Td that were similar, or even superior, to the prior art compositions.

The invention claimed is:

1. A kit for a polymerisable composition, said kit comprising:
   I. a first portion A constituted by a composition comprising at least one monomer a1 that is reactive towards a cationic species or a Lewis or Brönsted acid species, and at least one co-initiator b;
   II. a second portion B comprising at least one cationic salt e selected from the salts with formula S1, S3, and S4 below;

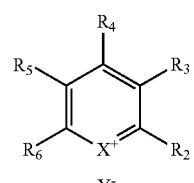

S1

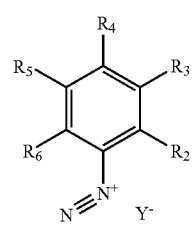

S3

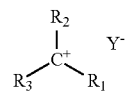

S4 in which X represents a carbon atom or a sulfur atom; Y represents one or more stabilizing anionic species for the cationic species of the salt S1, or S3, or S4; $R_1$ to $R_6$, independently of one another, are selected from the following atom or atoms or group or groups, alone or in combination: a hydrogen atom; a nitro group —$NO_2$; a cyano group —CN; a halogen atom; a $C_1$-$C_{20}$ alkyl group, a $C_1$-$C_{20}$ alkyl group substituted with one or more group(s) or one or more atom(s) selected independently from list I comprising the following groups or atoms: hydroxyl; carbonyl, alkenyl, aryl, heteroaryl, ether, ester, aldehyde, ketone, carboxylic acid, a halogen atom, primary amine, secondary amine, tertiary amine, primary amide, secondary amide, tertiary amide, urea, thioester, thiocarbonate, sulfoxide, sulfone, phosphine, phosphorane, phosphine oxide, cycloalkyl, heterocycloalkyl, or combinations thereof; a $C_1$-$C_{20}$ alkoxy group, a $C_1$-$C_{20}$ alkoxy group substituted with a $C_1$-$C_{20}$ alkyl group; a $C_1$-$C_{20}$ alkoxy group substituted with a $C_1$-$C_{20}$ alkyl group and one or more group(s) or one or more atom(s) selected equally well from list I; a $C_1$-$C_{20}$ alkoxy group substituted with one or more group(s) or one or more atom(s) selected equally well from list I, an aryl group; a heteroaryl group; a cycloalkyl group; a heterocycloalkyl group; an aryl group substituted with one or more group(s) independently selected from list I; an heteroaryl group substituted with one or more group(s) independently selected from list I; an heterocycloalkyl group substituted with one or more group(s) independently selected from list I; a cycloalkyl group substituted with one or more group(s) independently selected from list I; an acyl group; an aroyl group; an alkoxycarbonyl group; a carbamyl group.

2. The kit according to claim 1, wherein the reactive monomer a1, is selected or includes at least one group selected from the list constituted by cyclic ethers; cyclic acetals; cyclic amines; cyclic iminoethers; cyclic sulfides; vinyls; cyclic esters; cyclic amides; cycloalkyls substituted with at least one phosphorus atom; and cyclic siloxanes.

3. The kit according to claim 1, wherein the monomer a1 is or includes a $(C_3-C_{20}$ (hetero)cycloalkyl$)_n$ group, with $1 \leq n \leq 5$, n being an integer, said (hetero)cycloalkyl(s) being saturated or unsaturated and comprising, in at least one cycle, at least one function or one or more atom(s) or a group selected from the list constituted by: an ether group; an oxygen atom; two oxygen atoms; three oxygen atoms; a primary amine; a secondary amine; a tertiary amine; a primary amide; a secondary amide; a tertiary amide; an ester group; a carbonate group; an orthoester group; a —O—Si—O function; a vinylether function (—O—CH=CH$_2$); a halogen atom and a sulfur atom.

4. The kit according to claim 1, wherein the reactive monomer a1 is selected from cycloaliphatic epoxies.

5. The kit according to claim 1, wherein the co-initiator b is selected from or includes at least one group selected from list II constituted by: hydrogen peroxide; water; a $C_1-C_{20}$ alkyl group substituted with a hydroperoxide group —OOH and with a thiol group —SH; a $C_1-C_{20}$ alkyl group substituted with a hydroperoxide group —OOH; a $C_1-C_{20}$ alkyl group substituted with a thiol group —SH; a $C_1-C_{20}$ haloalkyl group substituted with a hydroperoxide group —OOH and with a thiol group —SH; a $C_1-C_{20}$ haloalkyl group substituted with a hydroperoxide group —OOH; a $C_1-C_{20}$ haloalkyl group substituted with a thiol group —SH; a $C_1-C_{20}$ aryl group substituted with a hydroperoxide (—OOH) and with a thiol group (—SH); a $C_1-C_{20}$ aryl group substituted with a hydroperoxide (—OOH), a $C_1-C_{20}$ aryl group substituted with a thiol group (—SH), a $C_1-C_{20}$ heteroaryl group substituted with a hydroperoxide (—OOH) and with a thiol group (—SH); a $C_1-C_{20}$ heteroaryl group substituted with a hydroperoxide (—OOH); a $C_1-C_{20}$ heteroaryl group substituted with a thiol group (—SH); a $C_1-C_{20}$ cycloalkyl group substituted with a hydroperoxide (—OOH) and with a thiol group (—SH); a $C_1-C_{20}$ cycloalkyl group substituted with a hydroperoxide (—OOH); a $C_1-C_{20}$ cycloalkyl group substituted with a thiol group (—SH); a $C_1-C_{20}$ heterocycloalkyl group substituted with a hydroperoxide (—OOH) and with a thiol group (—SH); a $C_1-C_{20}$ heterocycloalkyl group substituted with a hydroperoxide (—OOH); a $C_1-C_{20}$ heterocycloalkyl group substituted with a thiol group (—SH); an alkenyl group; an alkenyl group including at least one ether group.

6. The kit according to claim 1, wherein the proportion by weight of salt e relative to the weight of the final polymerisable composition comprising the first and second portions A and B is in the range 0.10% to 5%.

7. The kit according to claim 1, wherein the proportion by weight of the co-initiator relative to the weight of the final polymerisable composition comprising the first and second portions A and B is in the range 0.10% to 5%.

8. A polymerisable composition, comprising:
    at least one monomer a1 that is reactive towards a cationic species or a Lewis or Brönsted acid species;
    at least one co-initiator b;
    at least one cationic salt e selected from the salts with formula S1, S3, and S4 below;

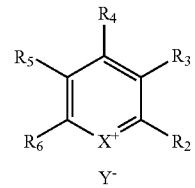

S1

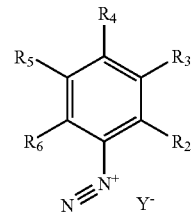

S3

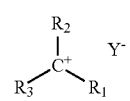

S4 in which X represents a carbon atom or a sulfur atom; Y represents one or more stabilizing anionic species for the cationic species of the salt S1 or S3, or S4; $R_1$ to $R_6$, independently of one another, are selected from the following atom or atoms or group or groups, alone or in combination: a hydrogen atom; a nitro group —NO$_2$; a cyano group —CN; a halogen atom; a $C_1-C_{20}$ alkyl group, a $C_1-C_{20}$ alkyl group substituted with one or more group(s) or one or more atom(s) selected independently from list I comprising the following groups or atoms: hydroxyl; carbonyl, alkenyl, aryl, heteroaryl, ether, ester, aldehyde, ketone, carboxylic acid, a halogen atom, primary amine, secondary amine, tertiary amine, primary amide, secondary amide, tertiary amide, urea, thioester, thiocarbonate, sulfoxide, sulfone, phosphine, phosphorane, phosphine oxide, cycloalkyl, heterocycloalkyl, or combinations thereof; a $C_1-C_{20}$ alkoxy group, a $C_1-C_{20}$ alkoxy group substituted with a $C_1-C_{20}$ alkyl group; a $C_1-C_{20}$ alkoxy group substituted with a $C_1-C_{20}$ alkyl group and one or more group(s) or one or more atom(s) selected equally well from list I; a $C_1-C_{20}$ alkoxy group substituted with one or more group(s) or one or more atom(s) selected equally well from list I, an aryl group; a heteroaryl group; a cycloalkyl group; a heterocycloalkyl group; an aryl group substituted with one or more group(s) independently selected from list I; an heteroaryl group substituted with one or more group(s) independently selected from list I; an heterocycloalkyl group substituted with one or more group(s) independently selected from list I; a cycloalkyl group substituted with one or more group(s) independently selected from list I; an acyl group; an aroyl group; an alkoxycarbonyl group; a carbamyl group.

9. A method of producing a coating or a composite material, comprising the following steps:
    (i) providing a first portion A constituted by a composition comprising at least one monomer a1 that is reactive towards a cationic species or a Lewis or Brönsted acid species, and at least one co-initiator b; and a second portion B comprising at least one cationic salt e selected from the salts with formula S1, S2, S3, and S4 below;

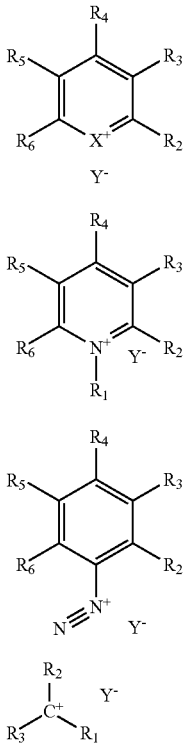

in which X represents a carbon atom or a positively charged heteroatom other than nitrogen; Y represents one or more stabilizing anionic species for the cationic species of the salt S1, or S2, or S3, or S4; $R_1$ to $R_6$, independently of one another, are selected from the following atom or atoms or group or groups, alone or in combination: a hydrogen atom; a nitro group —$NO_2$; a cyano group —CN; a halogen atom; a $C_1$-$C_{20}$ alkyl group, a $C_1$-$C_{20}$ alkyl group substituted with one or more group(s) or one or more atom(s) selected independently from list I comprising the following groups or atoms: hydroxyl; carbonyl, alkenyl, aryl, heteroaryl, ether, ester, aldehyde, ketone, carboxylic acid, a halogen atom, primary amine, secondary amine, tertiary amine, primary amide, secondary amide, tertiary amide, urea, thioester, thiocarbonate, sulfoxide, sulfone, phosphine, phosphorane, phosphine oxide, cycloalkyl, heterocycloalkyl, or combinations thereof; a $C_1$-$C_{20}$ alkoxy group, a $C_1$-$C_{20}$ alkoxy group substituted with a $C_1$-$C_{20}$ alkyl group; a $C_1$-$C_{20}$ alkoxy group substituted with a $C_1$-$C_{20}$ alkyl group and one or more group(s) or one or more atom(s) selected equally well from list I; a $C_1$-$C_{20}$ alkoxy group substituted with one or more group(s) or one or more atom(s) selected equally well from list I, an aryl group; a heteroaryl group; a cycloalkyl group; a heterocycloalkyl group; an aryl group substituted with one or more group(s) independently selected from list I; an heteroaryl group substituted with one or more group(s) independently selected from list I; an heterocycloalkyl group substituted with one or more group(s) independently selected from list I; a cycloalkyl group substituted with one or more group(s) independently selected from list I; an acyl group; an aroyl group; an alkoxycarbonyl group; a carbamyl group; and the mixture of the first and second portions A and B in order to form a polymerisable composition; and wherein the at least one co-initiator b is selected such that it reacts with the at least one cationic salt e in an exothermic reaction;

(ii) applying said polymerisable composition in one or more layers to a substrate or impregnating a reinforcement with said polymerisable composition; and (iii) polymerising said at least one monomer a1 under the action of a cation or of a Lewis or Brönsted acid species formed by the salt e under the action of said at least one co-initiator b, without adding external heat to said polymerisable composition, in order to form a coating or a composite material.

10. The method according to claim 9, wherein the step (iii) is carried out at a temperature in the range 10° C. to 30° C.

11. The kit according to claim 1 wherein the second portion B comprises at least one monomer a2 that is reactive towards a cationic species or a Lewis or Brönsted acid species.

12. The kit according to claim 1 wherein Y comprises at least one anionic species selected, alone or in combination, from Br—, Cl—, BF4-, PF6-, AsF6-, AnF6-, SbF6-, SnF6-, ClO4-, sulfonates.

13. The kit according to claim 1 wherein $R_1$ to $R_6$, independently of one another, are selected from atom(s) or group(s), alone or in combination which is/are arranged so as to carry one or more positive charges.

14. The kit according to claim 6 wherein the proportion by weight of salt e relative to the weight of the final polymerisable composition comprising the first and second portions A and B is in the range 0.5% to 3%.

15. The kit according to claim 7, wherein the proportion by weight of the co-initiator b relative to the weight of the final polymerisable composition comprising the first and second portions A and B is in the range 0.5% to 3%.

16. The polymerisable composition according to claim 8 wherein said composition comprises at least monomer a2 that is reactive towards a cationic species or a Lewis or Brönsted acid species, and at least one polymerisation rate regulating agent d.

17. The method according to claim 9 wherein the step (iii) is done also under the action of radiation or electron bombardment.

18. The method according to claim 9, wherein the coating has a thickness of more than 1 mm.

19. A kit for a polymerisable composition, the kit comprising:

I. a first portion A constituted by a composition comprising at least one monomer a1 that is reactive towards a cationic species or a Lewis or Brönsted acid species, and at least one co-initiator b;

II. a second portion B comprising at least one cationic salt e S1 below;

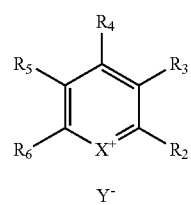

in which X represents a positively charged heteroatom other than nitrogen; Y represents one or more stabilizing anionic species for the cationic species of the salt S1; $R_2$ to $R_6$, independently of one another, are selected from the following atom or atoms or group or groups, alone or in combination: a hydrogen atom; a nitro group —$NO_2$; a cyano group —CN; a halogen atom; a $C_1$-$C_{20}$ alkyl group, a $C_1$-$C_{20}$ alkyl group substituted with one or more group(s) or one or more atom(s) selected independently from list I comprising the following groups or atoms: hydroxyl; carbonyl, alkenyl, aryl, heteroaryl, ether, ester, aldehyde, ketone, carboxylic acid, a halogen atom, primary amine, secondary amine, tertiary amine, primary amide, secondary amide, tertiary amide, urea, thioester, thiocarbonate, sulfoxide, sulfone, phosphine, phosphorane, phosphine oxide, cycloalkyl, heterocycloalkyl, or combinations thereof; a $C_1$-$C_{20}$ alkoxy group, a $C_1$-$C_{20}$ alkoxy group substituted with a $C_1$-$C_{20}$ alkyl group; a $C_1$-$C_{20}$ alkoxy group substituted with a $C_1$-$C_{20}$ alkyl group and one or more group(s) or one or more atom(s) selected equally well from list I; a $C_1$-$C_{20}$ alkoxy group substituted with one or more group(s) or one or more atom(s) selected equally well from list I, an aryl group wherein at most two groups among $R_2$ to $R_6$ are an aryl group; a heteroaryl group; a cycloalkyl group; a heterocycloalkyl group; an aryl group substituted with one or more group(s) or one or more atom(s) independently selected from the list comprising the following groups or atoms: hydroxyl; carbonyl, alkenyl, aryl, wherein at most two groups amount $R_2$ to $R_6$ are an aryl group, heteroaryl, ester, aldehyde, ketone, carboxylic acid, a halogen atom, primary amine, secondary amine, tertiary amine, primary amide, secondary amide, tertiary amide, urea, thioester, thiocarbonate, sulfoxide, sulfone, phosphine, phosphorane, phosphine oxide, cycloalkyl, heterocycloalkyl, or combinations thereof; a heteroaryl group substituted with one or more group(s) or one or more atom(s) independently selected from list I; a heterocycloalkyl group substituted with one or more group(s) or one or more atom(s) independently selected from list I; a cycloalkyl group substituted with one or more group(s) or one or more atom(s) independently selected from list I; an acyl group; an aroyl group; an alkoxycarbonyl group; a carbamyl group.

20. A kit for a polymerisable composition, said kit comprising:
   I. a first portion A constituted by a composition comprising at least one monomer a1 that is reactive towards a cationic species or a Lewis or Brönsted acid species, and at least one co-initiator b;
   II. a second portion B comprising at least one cationic salt e selected from the salts with formula S1, S3, and S4 below;

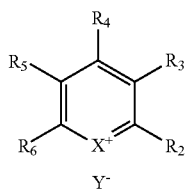

S1

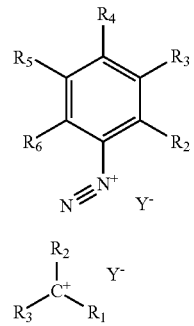

S3

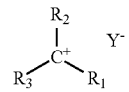

S4 in which X represents a carbon atom or a sulfur atom; Y represents one or more stabilizing anionic species for the cationic species of the salt S1, or S3, or S4; $R_1$ to $R_6$, independently of one another, are selected from the following atom or atoms or group or groups, alone or in combination: a hydrogen atom; a nitro group —$NO_2$; a cyano group —CN; a halogen atom; a $C_1$-$C_{20}$ alkyl group, a $C_1$-$C_{20}$ alkyl group substituted with one or more group(s) or one or more atom(s) selected independently from list I comprising the following groups or atoms: hydroxyl; carbonyl, alkenyl, aryl, heteroaryl, ether, ester, aldehyde, ketone, carboxylic acid, a halogen atom, primary amine, secondary amine, tertiary amine, primary amide, secondary amide, tertiary amide, urea, thioester, thiocarbonate, sulfoxide, sulfone, phosphine, phosphorane, phosphine oxide, cycloalkyl, heterocycloalkyl, or combinations thereof; a $C_1$-$C_{20}$ alkoxy group, a $C_1$-$C_{20}$ alkoxy group substituted with a $C_1$-$C_{20}$ alkyl group; a $C_1$-$C_{20}$ alkoxy group substituted with a $C_1$-$C_{20}$ alkyl group and one or more group(s) or one or more atom(s) selected equally well from list I; a $C_1$-$C_{20}$ alkoxy group substituted with one or more group(s) or one or more atom(s) selected equally well from list I, an aryl group; a heteroaryl group; a cycloalkyl group; a heterocycloalkyl group; an aryl group substituted with one or more group(s) independently selected from list I; a heteroaryl group substituted with one or more group(s) independently selected from list I; a heterocycloalkyl group substituted with one or more group(s) independently selected from list I; a cycloalkyl group substituted with one or more group(s) independently selected from list I; an acyl group; an aroyl group; an alkoxycarbonyl group; a carbamyl group; and wherein the first portion A includes a polymerization rate regulating agent d that is or includes:
   a $C_3$-$C_6$ heteroaryl wherein at least one atom of the heterocycle is nitrogen, said heterocycle being substituted with group(s) selected among: one or more $C_3$-$C_6$ aryl group(s); one or more $C_3$-$C_6$ aryl group(s) and with one or more $C_1$ to $C_{10}$ alkyl chains, and one or more $C_1$ to $C_{10}$ alkyl chains;
   a $C_3$-$C_6$ aryl group substituted with: a primary amine, a secondary amine, a tertiary amine; and/or with a $C_3$-$C_6$ aryl group; and/or with one or more $C_1$ to $C_{10}$ alkyl chains.

* * * * *